3,221,226
WRINKLE FREE POLYESTER FILM DIELECTRIC FOR CAPACITORS
William D. Kennedy, James J. Jefferson, and Marshall T. Watson, Kingsport, Tenn., assignors to Eastman Kodak Company, Rochester, N.Y., a corporation of New Jersey
Filed Dec. 20, 1960, Ser. No. 77,001
5 Claims. (Cl. 317—258)

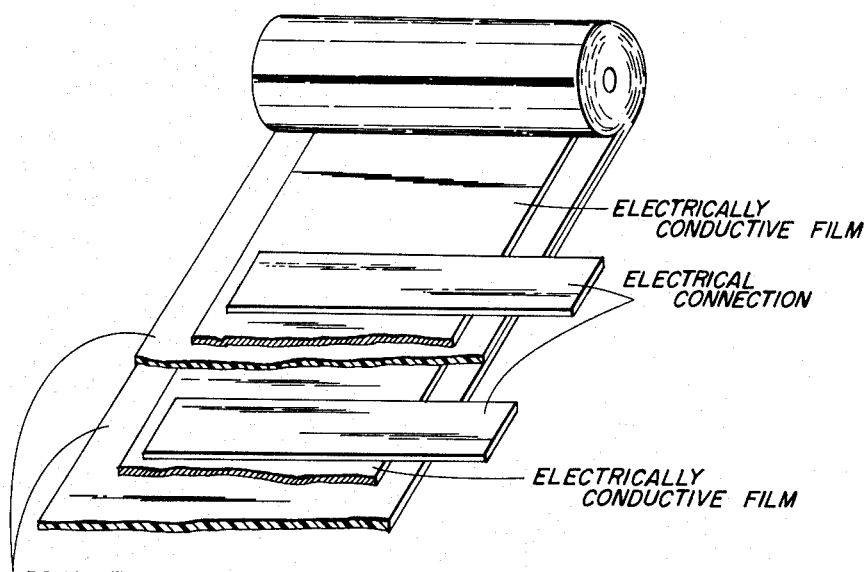
POLYESTER FILM LESS THAN 0.001 INCH THICK CONTAINING
0.01 TO 0.5 % INORGANIC PIGMENT, E.G. POLYESTER OF
TEREPHTHALIC ACID, ISOPHTHALIC ACID AND 1,4-CYCLOHEXANE
DIMETHANOL CONTAINING 0.08 % SILICA PARTICLES.
WILLIAM D. KENNEDY
JAMES J. JEFFERSON
MARSHALL T. WATSON
INVENTORS

United States Patent Office 3,221,226
Patented Nov. 30, 1965

This invention relates to polyester compositions and more particularly to thin films of same.

It has been known for some time that one of the major drawbacks of thin films of polyester, particularly linear highly polymeric condensation polyesters of one or more aromatic dicarboxylic acids or the esters thereof and a glycol, is a tendency to wrinkle in winding into a roll, because of failure of the film to slip smoothly on itself. In cases of film of less than about 0.001 inches in thickness, wrinkling can at times become so severe that the film is weakened or even torn at the wrinkled places. Moreover, rolls of such wrinkled film are difficult, if not impossible, to use for subsequent windings, for instance, for use as capacitors or other such products. Also, it has been oftentimes difficult to promote slip in polyester fabrics, and for some time it has been thought by those skilled in the art that the addition of any type of additive to such fabrics tends to increase wrinkling rather than to increase slipperiness.

It is an object of this invention to provide a novel polyester composition which is resistant to wrinkling when used in the form of film. The term "wrinkling" as used with reference to film throughout this specification is understood to mean the tendency of the film to form creases, narrow folds, and other such defects, as succeeding layers of film are wound into a roll, because of the failure of adjacent layers of film to slip or slide freely enough across one another to prevent these difficulties.

It is another object of this invention to provide a novel polyester composition which upon conversion into films and sheets can be wound in smooth and wrinkle-free rolls.

It is a further object of this invention to provide a polyester composition which, used as the dielectric in an electrical capacitor, results in substantial improvement thereof.

These and other objects will be apparent from the description and claims which follow.

We have found surprisingly that the incorporation of minor proportionate amounts of finely divided, inorganic pigments in linear highly polymeric condensation polyesters of one or more dicarboxylic acids or the esters thereof and a glycol produces a polyester composition which, when converted into thin films or sheets, or into fabrics, produces a highly desirable slipperiness therein and allows single sheets of films of said polyesters to be fed into automatic packaging equipment without wrinkling and to be processed into rolls or tubes which do not stick together. The finely divided, inorganic pigments used in the present invention have a particle size ranging from about 0.01 to about 10 microns. Amounts of the inorganic pigment of about 0.01% to 5.0%, and preferably from about 0.01% to about 0.5% based on the weight of the polyester, are used in the invention.

Illustrative of the finely divided, inorganic pigments which may be used in this invention are silica ($SiO_2$), titania ($TiO_2$), zirconia ($ZrO_2$), bentonite, alumina ($Al_2O_3$), gypsum, fluorite, kaolin (china clay), talc, and mica. Particularly good results in improving the slip properties of the polyester films have been obtained by the use of silica, titania, zirconia, alumina, and bentonite, these being preferred additives in this invention.

Illustrative of some of the polyesters in which the abovementioned inorganic pigments may be incorporated in accordance with this invention are polyethylene terephthalate, polyesters of terephthalic acid and 1,4-cyclohexanedimethanol, polyesters of dimethyl terephthalate and 1,4-cyclohexanedimethanol, polyesters of terephthalic acid, succinic acid, and 1,4-cyclohexanedimethanol, polyesters of terephthalic acid, isophthalic acid, and 1,4-cyclohexanedimethanol, and polyesters of 4,4'-sulfonyl-di-benzoic acid, succinic acid, and 1,5-pentanediol. Other polyesters which are suitable for the incorporation of the abovementioned additives for the production therein when fashioned in the form of thin films or sheets of slipperiness or antiwrinkling proporties are described in our coworkers' patent, U.S. Patent No. 2,901,466.

The present polyester composition can be prepared by any suitable method for insuring a substantially uniform mixture of the polyester and the additive in the final fabricated article. The inorganic pigment may be conveniently incorporated in the polyester by blending the ingredients in apparatus such as a Banbury mixer, heater rolls, or in combinations thereof. The additive can be incorporated during polymerization of the polyester, by dry mixing with the polymerized resin, by dry mixing a concentrate in a suitable resin with the polyester resin, by stirring in some suitable dispersion medium, by simply dusting on the finished film before winding, this being a special feature of the present invention, or from a dispersion in water or other liquid with an appropriate baking treatment. The polyester with the inorganic pigment incorporated therein may be extruded or cast into the thin film or sheeting of the thickness desired, or spun into a fiber and woven into a substantially wrinkle-proof fabric. We have found unexpectedly that fabrics woven from fibers spun from the polyester-pigment combinations of this invention show reduced wrinkling after washing and drying. During washing of wash-and-wear fabrics, considerable wrinkling can occur, which can recover and thus disappear only by slippage past one another of the fibers in the fabric during tumble-drying. By decreasing inter-fiber friction by inclusion of the additives of this invention, we have been able to produce fabrics which are substantially wrinkle-proof after wash-and-dry treatment.

One of the advantages of our polyester compositions containing inorganic pigments is that such compositions allow the production of films, "lay-flat film" made as blown tubing, sheets, shaped tubes and other shaped articles which are highly resistant to wrinkling and sticking together. This resistance to wrinkling and sticking together facilitates their use in many commercial operations such as the handling of polyester films and sheets in packaging apparatus. The fact that such a minor proportionate amount of a finely divided, inorganic pigment such as those enumerated above would have such an effect on polyesters was an anomaly in view of the fact that representative pigments such as silica are commonly added to yarn, fabrics of wool, rayon and the like to decrease slipperiness, such being disclosed in Powers et al., U.S. Patent No. 2,527,329, wherein an increase of the coefficient of friction by the addition of silica is disclosed. As stated above, a minor proportionate amount of silica as well as the other additives of this invention has the opposite effect on polyesters, i.e., it increases the slipperiness thereof.

Another surprising result achieved by incorporating small or minor proportionate amounts of the abovementioned finely divided, inorganic pigments in polyesters in accordance with the invention is the retention of the substantially colorless nature of the polyesters in which said pigments are incorporated. Moreover, these additives cause no deleterious effects on physical or electrical properties of the resulting film.

The figure of the drawing illustrates an improved electrical capacitor according to this invention as more specifically described in Example I hereinbelow.

Although the compositions of this invention contain principally polyesters having incorporated therein small amounts of the finely divided, inorganic additives referred to hereinabove, they may also contain small amounts of other desirable additives such as antioxidants, dyes, antistatic agents and the like, provided the additional ingredients are not present in amounts sufficient to alter the inorganic pigments.

In addition to their use in films and sheeting, the polyester compositions herein disclosed and claimed may also be cast, extruded, or molded into rods, tubes, and piping, filaments and other shaped articles. They may also be used for coating paper, wire, glass and fiber mats.

Although we do not wish to be held by any particular theory of how the additives of this invention cause polyester filaments or films to slide over one another, we have noticed that substantially all of the additives which we have found to produce the desired effect have refractive indices which are in the neighborhood of the refractive index of the particular polyester in which they are incorporated. In fact, we have found that for best results the inorganic pigment additive used should have a refractive index within only a few tenths of that of the polyester to which it is added. The following table illustrates this striking feature.

*Refractive indices of representative additives for films of polyesters, e.g., 5:1:6 terephthalic acid, isophthalic acid, 1,4-cyclohexanedimethanol polyester (refractive index 1.54–1.60) and polyethylene terephthalate (refractive index 1.64)*

| Additive: | Refractive Index |
|---|---|
| Fluorite | 1.434 |
| Silica gel (Davison Chem. Co. "Syloid") | 1.46 |
| Gypsum | 1.523 |
| $SiO_2$ | 1.544 |
| Aerosil (Godfrey L. Cabot, Cabot Co., "Vaporphase silica") | 1.55 |
| Bentonite | 1.55 |
| Kaolin (china clay) | 1.561–1.567 |
| Talc | 1.589 |
| Mica | 1.598 |
| $BaSO_4$ | 1.64 |
| $CaCO_3$ (Wyandotte Chemicals Corp. "Purecal") | 1.657 |
| $Al_2O_3$ | 1.760–1.768 |

By the above table it can readily be seen that substantially all of the additives of this invention have a refractive index within the range of from about 1.4 to about 1.8.

The invention is illustrated by the following examples of preferred embodiments thereof.

EXAMPLE I

To 75 lbs. of a polyester resulting from the condensation of terephthalic acid, isophthalic acid, and 1,4-cyclohexanedimethanol in molar ratios of 5:1:6 and containing an antioxidant was added 27.2 g. (ca. .08%) of finely divided silica having an average particle size of about 3 microns. The mixture was then dried under vacuum for about 40 hrs. at approximately 80° C. The resin mix was then extruded into film, using a conventional extruder. The film was hot-drafted 170% under radiant heat, hot-tentered 185% at about 99° C., and heat-set at 215° C. to produce a 400 ft. roll of film 0.0003 in. thick. This film was slit into 1 5/16-in. wide tapes and rewound, producing smooth, wrinkle-free rolls.

The same polyester, but with no silica, was similarly dried, extruded, cross-stretched, and heat-set to a 0.0003-in. thick film. This film was slit into 1 5/16-in. tapes and rewound, producing soft, wrinkled rolls.

Thirty-five turn capacitors, having a single-layer dielectric, were wound from both the above rolls containing the silica and those containing no silica, using about 20 in. of film as the dielectric per capacitor. Based on physical appearance of the capacitors and a 24-volt A.C. dielectric strength test, all of 25 capacitors made from the polyester containing the silica were acceptable, whereas, of 33 capacitors made from the polyester containing no silica only 12 were acceptable, and even these 12 were inferior in appearance, having ragged edges and wrinkles.

EXAMPLE II

A mixture of resin was prepared containing 0.04 wt. percent silica gel added to the reactants described in Example I before polymerization thereof. This resin was extruded and hot-drafted 200% to produce 3,000 ft. of film about .0004-in. thick in a smooth roll which was subsequently slit and rewound to give smooth, wrinkle-free rolls. The same resin containing no additive was similarly extruded and hot-drafted 200% to produce 2,800 ft. of film about .0004 in. thick. This roll was somewhat wrinkled, and on subsequent attempts to slit and rewind, it was impossible to obtain rewound rolls that were not bady wrinkled.

EXAMPLE III

A polyester resin (terephthalic acid, succinic acid, and 1,4-cyclohexanedimethanol condensation polymerized in molar ratios of 3:1:4) was prepared containing 1/4 part by weight of $TiO_2$ having an average particle size of $0.2\mu$ per 100 parts of resin. The $TiO_2$ was added prior to polymerization. This resin was extruded as 0.0005-in. thick film, 4,500 ft. of which were wound into a smooth, wrinkle-free roll.

EXAMPLE IV

A polyester resin (4,4'-sulfonyl-di-benzoic acid, succinic acid, and 1,5-pentanediol condensation polymerized in molar ratios of 5:1:6) was prepared containing 1/4 part by weight of $TiO_2$ having an average particle size of 0.2 micron per 100 parts of resin added before polymerization. This resin was extruded into film, hot-drafted 100% to 0.0005-in. thickness, and wound into a smooth, wrinkle-free roll 4,000 ft. long.

The same polyester resin containing no additive was extruded into film, hot-drafted 100% to 0.0005 in. thickness, and wound into a roll 1,400 ft. long. Considerable difficulty was encountered in winding this film, and the finished roll was badly wrinkled.

EXAMPLE V

A polyester resin of the same components as those of Example IV was prepared containing 1/8 part by weight of $TiO_2$ per 100 parts of resin. Again the $TiO_2$ was added before polymerization. This resin was extruded into film, hot-drafted 200% to 0.0003-in. thickness, and wound into a smooth, wrinkle-free roll 2,500 ft. long.

EXAMPLE VI

A polyester resin was prepared as in Example IV except that 0.08 wt. percent of bentonite instead of $TiO_2$ was added before polymerization. This resin was extruded into film 0.0005-in. thick and wound into a smooth, wrinkle-free roll 900 ft. long.

EXAMPLE VII 138 lbs. of the resin used in Example VI above were blended with an equal amount of polyester resin of the same composition but without additive to give a final composition containing 0.04 wt. percent bentonite. This resin was extruded into film 0.0002-in. thick and wound into a smooth, wrinkle-free roll 2,000 ft. long.

EXAMPLE VIII

A polyester resulting from condensation of terephthalic acid, isophthalic acid, and 1,4-cyclohexanedimethanol in molar ratios of 5:1:6 was polymerized, 0.05 wt. percent silica (average particle size ca. 3μ diameter, refractive index 1.46) being added during polymerization. This resin was vacuum dried, extruded, hot-drafted 185%, hot-tentered 195%, and heat-set at 220° C. to produce a smooth, wrinkle-free roll of film 5,000 ft. long and 0.0025-in. thick. The same polyester without silica was similarly processed into film which wrinkled so bady on winding that it was impossible to produce an acceptable roll even a few hundred feet in length.

EXAMPLE IX

A polyester resin prepared as in Example VIII but containing only 0.025 wt. percent silica was vacuum dried, extruded, hot-drafted 190%, hot-tentered 185%, and heat-set at 210° C. to produce a smooth, wrinkle-free roll of film 8,000 ft. long and 0.00025-in. thick.

EXAMPLE X

A polyester resin prepared as in Example VIII was dry mixed after polymerization with 0.08 wt. percent bentonite (average particle size 2μ, refractive index 1.55). The mixture was vacuum dried, extruded, hot-drafted 200%, hot-tentered 200%, and heat-set at 200° C. to produce a smooth, wrinkle-free roll of film 5,000 ft. long and 0.0005 in. thick.

EXAMPLE XI

A polyester resulting from condensation of terephthalic acid and 1,4-cyclohexanedimethanol in molar ratios of 1:1 was polymerized, 0.33 wt. percent $TiO_2$ (average particle diameter ca. 0.3μ, refractive index 2.55) being added during polymerization. The resin [poly(1,4-cyclohexylenedimethylene terephthalate)] was vacuum dried, extruded, hot-drafted 205%, hot-tentered 180%, and heat-set at 220° C. to produce a smooth, wrinkle-free roll of film 300 ft. long and 0.0007 in. thick.

EXAMPLE XII

Polyester films were extruded in 5–10 mil thicknesses, with and without additives dry mixed therewith prior to extrusion, and these films were subjected to a laboratory test to evaluate the effect of the additive in promoting slipperiness of the film on itself. The test consisted of measuring the load required to slide a small 58-g. sled, the bootom surface of which was covered with a sample of the film, for a distance of 7 in. over a 3-in. x 10-in. sample of the same film taped to a flat surface. The sled had a bottom surface area of about 1½ in. x 3 in. and was pulled at a speed of 10 in. per minute. An Instron tensile tester was used to record the load. Results are summarized in the following table:

creases formed in the outermost film layer going onto the package, resulting in a final roll of film which was badly wrinkled. A commercial hand dust sprayer such as is often used for garden spraying of insecticide dusts was used to spray a thin layer of talc (average particle size ca. 8μ, refractive index ca. 1.63) onto the film just before it passed onto the windup roll. It was observed that as long as a fine talc spray was put onto the film, no wrinkles formed in the outermost film layer going onto the package, a smooth, wrinkle-free roll of film being thus obtained.

EXAMPLE XIV

A polyester resin of the composition given in Example IV, but containing no additive, was extruded into film and drafted 50% under radiant heaters to a final thickness of about 0.0005 inch. As in Example XIII, wrinkles and creases formed in the film as it was wound into a package, resulting in a final roll of film which was badly wrinkled. A coarse felt-covered idler roll, the lower half of which was immersed in a trough containing talc (average particle size ca. 8μ, refractive index ca. 1.63), was mounted just prior to the film windup so that the film emerging from the drafter rode across the top of this idler roll, causing the latter to turn and deposit a fine layer of talc from the trough on the bottom side of the film, just before the film passed onto the windup roll. It was observed that as long as the film picked up a fine layer of talc in this way, no wrinkles formed in the outermost layer going onto the final package so that a smooth, wrinkle-free roll of film was obtained.

EXAMPLE XV

A polymer made by condensing dimethyl terephthalate with 1,4-cyclohexanedimethanol and containing 0.5% finely divided silica gel was melt-spun by means of conventional melt-spinning equipment into yarn which was then drawn, heat-set, and cut into staple fibers of 3 deniers per filament and 2 inches in length. This staple was processed on the cotton system to spun yarn, which was then woven into a fabric with a plain-weave construction. This fabric showed excellent wrinkle resistance when it was laundered and tumble-dried in home-type equipment.

The compositions of the invention have many important uses which relate principally to the ease of separating contacting surfaces of polyesters. These surfaces may be flat or in a stack of sheets, roll of film articles or other shapes, tubular (lay-flat) film, or other forms of polyesters which in the absence of the invention would adhere.

Although the invention has been described in detail with reference to certain embodiments thereof, it will be

| Sample No. | Polyester film | Additive | Av. particle size of additive (μ) | Approx. refractive index of additive | Av. load required to pull sled (g.) ÷ sled wt. (g.) |
|---|---|---|---|---|---|
| 1 | Poly(ethylene terephthalate). | None | | | 9.1 |
| 2 | ---do--- | 0.1% $SiO_2$ | Diameter 3 | 1.46 | 0.8 |
| 3 | 5:1:6 terephthalic acid, isophthalic acid,1,4-cyclohexanedimethanol. | None | | | 9.2 |
| 4 | ---do--- | 0.1% talc | 8 | 1.63 | 2.8 |
| 5 | ---do--- | 0.1% $ZrO_2$ | Width 2.5, thickness 0.06. | + 2.20 | 3.5 |
| 6 | ---do--- | 0.1% $Al_2O_3$ | Width 3, thickness 0.02. | 1.77 | 6.3 |

The film of Sample 5 had a slightly bluish-white appearance, but was substantially colorless. The other films were substantially colorless and clear.

EXAMPLE XIII

A polyester resin of the composition given in Example IV, but containing no additive, was extruded into film and drafted 110% under radiant heaters to a final film thickness of about 0.0007 inches. It was observed that as this film was wound into a package, wrinkles and understood that variations and modifications can be effected within the scope and spirit of the invention as described hereinabove and as defined by the appended claims.

We claim:
1. An electrical capacitor comprising a smooth roll of polyester film which has a thickness of less than about 0.001 inch, said polyester comprising a linear highly polymeric condensation polyester of at least one aromatic dicarboxylic acid and a glycol containing dispersed therein from about 0.01 to about 0.50 percent by weight of said polyester of a finely divided inorganic pigment having a refractive index of from about 1.40 to about 2.55, the particles of said pigment having an average diameter of from about 0.01 to about 10 microns whereby said film has an appearance substantially unaltered by the presence of said pigment which is selected from the group consisting of silica, titania, zirconia, alumina and bentonite, said roll consisting of a plurality of alternating layers of said polyester film and an electrically conductive film superimposed in a successive relationship such that wrinkling is avoided by the presence of said pigment.

2. An electrical capacitor according to claim 1 wherein said polyester is essentially composed of polyethylene terephthalate.

3. An electrical capacitor according to claim 1 wherein said polyester is essentially composed of a polymer of terephthalic acid, isophthalic acid and 1,4-cyclohexanedimethanol.

4. An electrical capacitor according to claim 3 wherein said pigment is silica.

5. An electrical capacitor according to claim 1 wherein said polyester is essentially composed of a polymer of 4,4-sulfonyldibenzoic acid, succinic acid and 1,5-pentanediol.

References Cited by the Examiner

UNITED STATES PATENTS

| | | | |
|---|---|---|---|
| 2,764,718 | 9/1956 | Peck et al. | 260—40 |
| 2,819,173 | 1/1958 | Dithmar | 260—40 |
| 2,893,970 | 7/1959 | Caldwell et al. | 260—40 |
| 2,923,977 | 2/1960 | Lamphier et al. | 18—57 |
| 2,984,569 | 5/1961 | Huys et al. | 96—87 |

FOREIGN PATENTS

| | | |
|---|---|---|
| 161,646 | 6/1953 | Australia. |

OTHER REFERENCES

British Journal of Photography, April 12, 1957, p. 214.

ALEXANDER WYMAN, *Primary Examiner.*

CARL F. KRAFFT, EARL M. BERGERT, *Examiners.*